United States Patent
Will

[15] 3,697,053
[45] Oct. 10, 1972

[54] STIRRING DEVICE
[72] Inventor: Michael J. Will, 448 Rex Boulevard, Elmhurst, Ill. 60126
[22] Filed: May 10, 1971
[21] Appl. No.: 141,611

[52] U.S. Cl. ................................259/108, 99/348
[51] Int. Cl. .............................................B01f 7/16
[58] Field of Search......259/107, 108, 116, 118, 119, 259/121, 122; 99/348

[56] References Cited

UNITED STATES PATENTS

| 2,805,843 | 9/1957 | Block | 259/108 |
| 3,011,768 | 12/1961 | Clark | 259/108 |
| 3,251,581 | 5/1966 | Jensen | 259/108 |
| 3,357,685 | 12/1967 | Stephens | 99/348 |

Primary Examiner—Robert W. Jenkins
Attorney—Hill, Sherman, Meroni, Gross & Simpson

[57] ABSTRACT

This invention relates in general to stirring devices and in particular to an appliance that may be detachably mounted in a cooking container and energized for stirring material in the container. The appliance may be spring driven, battery operated or may be powered by a motor directly connected to power in a wall socket, for example.

10 Claims, 5 Drawing Figures

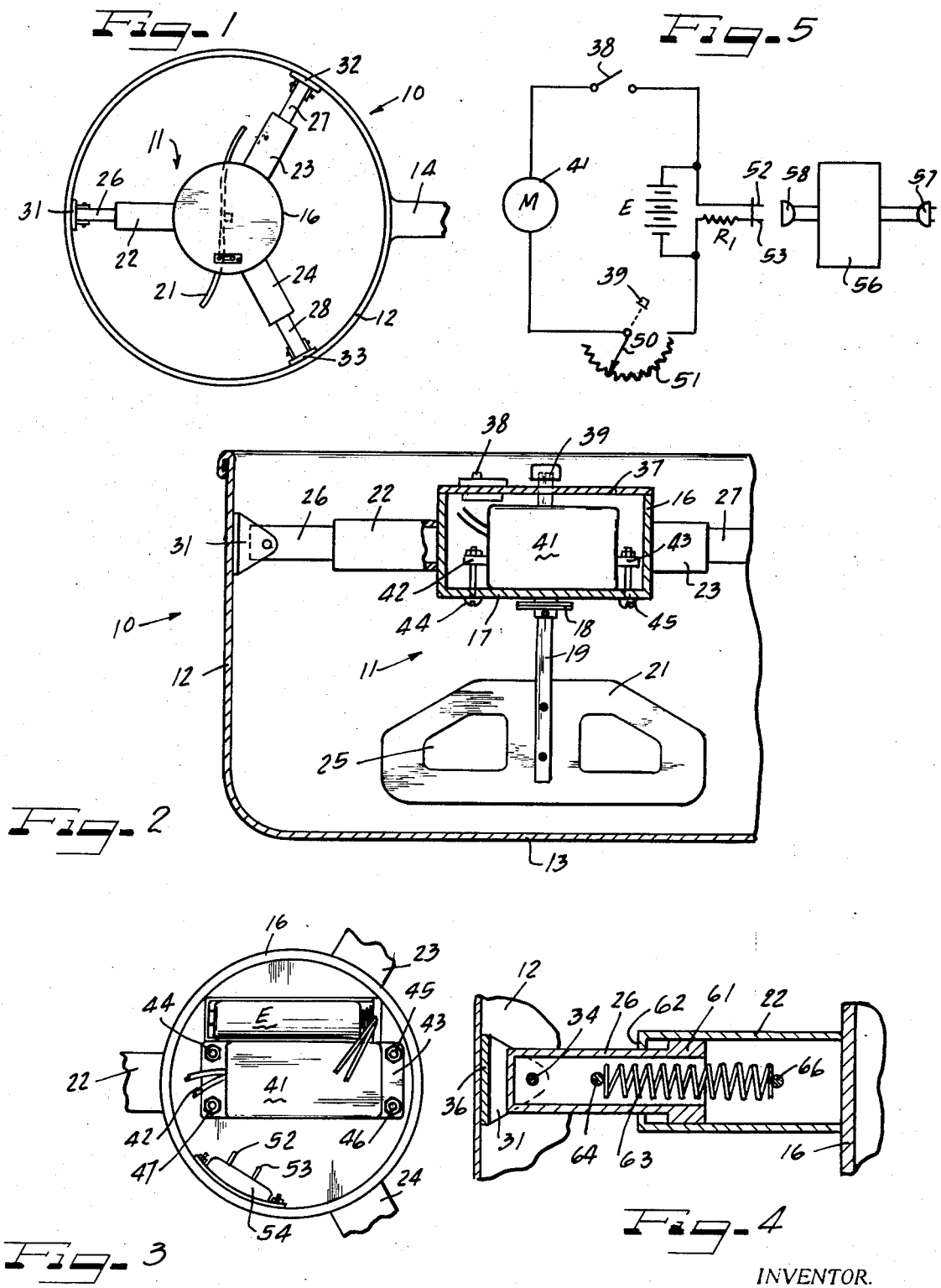

STIRRING DEVICE

BACKGROUND OF THE INVENTION

1. Field of the Invention

This invention relates in general to stirring devices and in particular to stirring devices for cooking containers.

2. Description of the Prior Art

Various manual and powered mixing devices have been known such as, for example, the common egg-beater or electric mixer, but generally these appliances must be held by the operator over the container as mixing occurs. Certain items must be stirred continuously or frequently while they are being cooked and it is painful and in certain instances impossible for an operator to hold a stirring appliance by hand over the container due to the high temperature.

BRIEF SUMMARY OF THE INVENTION

The present invention comprises a stirring appliance formed with a central body portion of high-temperature resistant plastic and to which are attached a plurality of telescoping legs with pivoted feet for engagement with the inner wall of a cooking container. The telescoping legs allow the appliance to be adapted to fit different sized containers and the unit is sealed so as to allow easy cleaning and to prevent contamination from the stirring device to material in the cooking container. A stirring blade extends from the central body portion into material in the cooking container and is driven by suitable driving means which might be a spring-energized motor, or an electric motor driven directly by a suitable power supply, or by a battery driven motor. Means are provided for adjusting the speed of the stirring paddle and for recharging the battery of the battery driven model. Thus, when the appliance is not being used it can be recharged so that it is available for continuous service.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a top view of a cooking container with the appliance of this invention mounted therein;

FIG. 2 is a partial sectional view of the cooking container and appliance of this invention mounted therein;

FIG. 3 is an enlarged detailed view of the invention;

FIG. 4 is a cut-away sectional view of one of the telescoping legs of the invention; and FIG. 5 is a schematic view of one embodiment of the invention.

BRIEF DESCRIPTION OF THE PREFERRED EMBODIMENTS

FIG. 1 illustrates the appliance of this invention mounted in a cooking container. The stirring appliance 11 is mounted in a cooking container 10 which might have a handle 14. The appliance has a central main body portion 16 from which three telescoping legs extend. Inner portions of the telescoping legs are identified by numerals 22, 23 and 24 and slidably carry leg portions 26, 27 and 28, respectively, which are spring-biased toward the container 10.

The ends of the portions 26, 27 and 28 pivotally support feet or wall-engaging members 31, 32 and 33, respectively, as shown in greater detail in FIG. 4. FIG. 4 is a sectional view through leg portions 22 and 26. The leg portion 22 is hollow and is formed with an end shoulder 62. The portion 26 has an enlarged portion 61 within the hollow portion of member 22 which limits the outer motion of portion 26 relative to portion 22. A pin 66 extends transversely across the portion 22 and is engaged by a spring 63. A second pin 64 extends across the leg portion 26 and the second end of the spring 63 rests against it holding the spring in compression.

The wall-engaging foot 31 is pivotally supported at the other end of portion 26 by a pin 34 and a resilient pad 36 is attached to the end of the foot 31 as shown. The pad 36 might be made of Neoprene or other suitable heat-resistant material. The pad 36 rests against the wall 12 of the cooking container 10.

As shown in FIG. 1, the telescoping legs center the appliance with the container 10 and firmly support it above the material within the container which is to be stirred.

As shown in FIG. 2, the central body portion has a lower wall 17 in which a bearing and seal 18 is mounted through which the stirring shaft 19 extends. A stirring paddle 21 is supported on the stirring shaft 19 as shown in FIGS. 1 and 2. The stirring paddle 21 may have openings 25 formed therein if desired. The stirring paddle 21 may also be curved as shown in FIG. 1 for improved stirring characteristics. A driving means 41 is mounted in the sealed main body portion 16 as shown in FIGS. 2 and 3. The driving means has brackets 42 and 42 and may be supported from the bottom wall 17 by suitable holding means 44, 45, 46 and 47 which engage the brackets.

A starting switch 38 mounted in the upper wall or cover 37 of the main body portion 16 and a speed control knob 39 also extends from the cover 37.

A driving means 41 may also be a spring motor which can be wound by the knob 39. Alternatively, driving means 41 may include an electric motor that may be battery powered or which may be driven directly from the conventional power source, such as 110 volts A.C.

In a preferred embodiment, as shown in FIG. 5, the power source 41 may be a direct current motor which is driven by battery E. The battery E may be recharged by a suitable rectifying and charging unit 56. The recharging unit 56 has a power plug 57 for insertion in a suitable power outlet so as to receive 110 volts A.C. power, for example. The rectifying recharging unit 56 converts the voltage to a suitable low voltage level and rectifies it and supplies it to output terminal 58. The appliance 11 is provided with a suitable recharging terminal housing 54 as best shown in FIG. 3 which mates with the terminal 58. The terminal 54 may have a pair of recessed male prongs 52 and 53 for engagement with the plug 58 and applies power to the battery E through current limiting resistor R1 as shown in FIG. 5. An ON-OFF switch 38 is connected in series with the motor 41 as shown in FIG. 5. A rheostat is connected in series between the motor and the power supply and includes a variable wiper contact 50 and slide resistor 51. The power supply is controlled by knob 39. The position of the variable contact 50 relative to the resistor 51 determines the speed of the motor 41.

In operation, the stirring appliance 11 of this invention is inserted in the cooking container 10 by depressing the telescoping legs and placing it in the container and then releasing the legs so that they extend to engage the side walls 12 of the container. The appliance is then held firmly within the container for operation. The ON-OFF switch 38 may be closed and the motor 41 will start to drive the blade 21 through a suitable gear reduction at a speed determined by the setting of the knob 39. The main body portion 16 is formed of heat-resistant plastic which can withstand temperatures up to 550°F., for example, and is sealed so as to be waterproof so that the driving unit 41 will be protected.

The pivoted feet 31 allow adequate stability and friction for cookware of various shapes and the unit may be mounted in acute and obtuse angled containers.

The speed of the blade might be about 18 rpm for satisfactory stirring.

The power unit 41 may include a gear reduction box that provides suitable torque for driving the blade in heavy substances. Since the appliance is completely sealed it is easy to clean and may be washed and dried without injuring the battery and driving unit.

When not in use the chargeable embodiment may be connected to the charger 56 so that the battery will be maintained at full charge. The A.C. powered embodiment would include a heat-resistant extension cord from the motor to a power outlet. The spring-driven unit would be occasionally wound by hand.

It is seen that this invention provides an automatic stirring device of simple and compact construction which is adapted to be mounted in cooking containers of different sizes and shapes.

Although minor modifications might be suggested by those versed in the art, it should be understood that I wish to embody within the scope of the patent warranted hereon all such modifications as reasonably and properly come within the scope of my contribution to the art.

I claim as my invention:

1. An appliance for stirring materials in a container comprising:
   a main body portion;
   a plurality of telescoping legs with first ends attached to said main body portion and second ends engageable with the inside wall of said container;
   a variable speed motor mounted in said main body portion;
   a stirring shaft connected to said motor and rotatably extending through said main body portion;
   a stirring blade attached to said stirring shaft; and,
   a variable speed control extending from said main body portion and connected to said variable speed motor to control its speed.

2. An appliance according to claim 1 wherein said main body portion and said telescoping legs are constructed of heat-resistant plastic capable of withstanding temperatures up to 550°F.

3. An appliance according to claim 1 wherein each of said telescoping legs are formed of two parts with one part slidably received in the other, spring means biasing said parts to the extended position, one end of one part attached to said main body portion, and one end of the other part engageable with the inside wall of said container.

4. An appliance according to claim 3 wherein each of said other parts have a wall-engaging foot pivotally attached to said one end.

5. An appliance according to claim 4 wherein each of said wall-engaging feet have resilient pads attached to provide frictional contact with said side wall of said container.

6. An appliance according to claim 5 wherein said resilient pads are made of Neoprene.

7. An appliance according to claim 1 wherein said variable speed motor is a D.C. motor, and a battery is mounted in said main body portion and is connected to said D.C. motor.

8. An appliance according to claim 7 comprising recharging terminals mounted in said main body portion and connected to said battery, and a battery recharger connectable to said recharging terminals.

9. An appliance according to claim 1 wherein said variable speed motor is a spring-driven motor and includes means for winding said spring.

10. An appliance according to claim 1 including a gear reduction mounted in said main body portion and connected between said variable speed motor and said stirring shaft.

* * * * *